United States Patent [19]

Aoyagi

[11] Patent Number: 4,841,505

[45] Date of Patent: Jun. 20, 1989

[54] PICKUP POSITION CONTROL METHOD ENABLING RESTART OF REPRODUCTION AFTER INTERRUPTION

[75] Inventor: Yoshio Aoyagi, Saitama, Japan

[73] Assignee: Pioneer Electronic Corporation, Tokyo, Japan

[21] Appl. No.: 268,671

[22] Filed: Oct. 28, 1988

Related U.S. Application Data

[63] Continuation of Ser. No. 26,314, Mar. 16, 1987, abandoned.

[30] Foreign Application Priority Data

Mar. 14, 1986 [JP] Japan .................................. 61-57277

[51] Int. Cl.⁴ .............................................. G11B 7/00
[52] U.S. Cl. ........................................ 369/32; 369/44
[58] Field of Search .......................... 369/32, 44, 137; 360/69, 75

[56] References Cited

U.S. PATENT DOCUMENTS 4,623,993 11/1986 Schlösser ............................... 369/44
4,635,145 1/1987 Horie et al. ............................ 360/69

FOREIGN PATENT DOCUMENTS

| 85411 | 7/1978 | Japan | 360/75 |
| 208673 | 12/1982 | Japan | 360/75 |
| 210483 | 12/1982 | Japan | 360/78 |
| 70550 | 4/1985 | Japan | 360/69 |
| 229278 | 11/1985 | Japan | . |

*Primary Examiner*—William H. Beha, Jr.
*Attorney, Agent, or Firm*—Sughrue, Mion, Zinn, Macpeak & Seas

[57] ABSTRACT

In a method and apparatus of controlling the position of the pickup of a disk player, when the power supply is interrupted during reproduction, data recorded on the disk is read by the pickup held on the prior spot. According to address data in the data thus read, a certain reproduction start position is determined, so that the reproduction is started from that position, whereby the difficulty that the music is reproduced from halfway is prevented.

5 Claims, 2 Drawing Sheets

PICKUP POSITION CONTROL METHOD ENABLING RESTART OF REPRODUCTION AFTER INTERRUPTION

This is a continuation of application Ser. No. 07/026,314 filed Mar. 16, 1987, now abandoned.

BACKGROUND OF THE INVENTION

1. Field of the Invention

This invention relates to a method of controlling the position of a pickup. More particularly, the invention relates to a pickup position control method for a disk player in which, when the power supply is interrupted during reproduction, the pickup is held at the last reading position.

2. Background of the Prior Art

Compared with other types of disk players for reproducing signals recorded on disk-shaped recording media such as digital audio disks (hereinafter referred to as merely "disks"), a mobile disk player or a portable disk player has an increased chance that the power supply is interrupted during reproduction. When the power supply is interrupted in this manner, a problem lies in determining the point on the disk from which the reproduction is started again when the electric power is once again supplied to the disk player.

As a solution of the problem, a disk player has been proposed in the art in which, when the power supply is interrupted during reproduction, the address data of the last reading position is obtained from the data which has been read by the pickup prior to interruption of the power supply. This address data is stored in a backup memory and the pickup is returned to its home position upon power interruption. When the electric power is supplied to the disk player again, the address data of the last reading position is read out of the backup memory and the pickup is moved to the address position thus read out. The reproduction is restarted from that position.

The conventional disk player described above is disadvantageous in that it is relatively high in manufacturing cost because it is necessary to use the backup memory.

The use of the backup memory has been eliminated by another disk player in which, when the power supply is interrupted during reproduction, the pickup is held mechanically at the last reading position. When the electric power is supplied to the disk player again, the reproduction is started from the last reading position.

If a disk which is eccentric is played by the disk player in which the pickup is held mechanically at the last reading position, then for the eccentricity, the spot light (data reading point) of the pickup is driven radially of the disk by the actuator of the pickup to follow a predetermined track. However, if the power supply is interrupted during the track following operation, the actuator is returned to the neutral position, as a result of which a difference corresponding to the eccentricity can exist between the position where the pickup is mechanically held and the last reading position of the spot light. In other words, if the disk is eccentric, then the accuracy of holding the pickup in place is substantially limited by the eccentricity of the disk.

According to the disk standard, the eccentricity of a disk is ±0.2 mm, which is about 27 to 77 sec. in terms of reproduction address time. Because of this great fluctuation, when the electric power is supplied to the disk player after the interruption of the power supply, the reproduction cannot be started from the last reading position.

Furthermore, a problem occurs, not only in the disk player of the type that the address data of the last reading position is stored in the backup memory but also in the disk player of the type that the pickup is held mechanically at the last reading position. When the electric power is supplied to the disk player again, the reproduction is started from the last reading position, i.e., the music is reproduced a second time from the last reading position. Therefore, the person perceives the reproduced music to be unnatural.

SUMMARY OF THE INVENTION

Accordingly, an object of this invention is to provide a pickup position control method which eliminates the above-described difficulties accompanying a conventional disk player in which, when the power supply is interruption during reproduction, the pickup is held at the last reading position.

The foregoing object and other objects of the invention have been achieved by the provision of a pickup position control method for a disk player. In this method, when the power supply is interrupted during reproduction, the pickup for reading data recorded on a disk-shaped recording medium is held at the last reading position. According to the invention, data recorded on the disk-shaped recording medium is read by the pickup on the previously held spot when the power supply is resupplied to the disk player. According to read address data in the data thus read, predetermined address data in one and the same group of data to which the read address data belong is employed as target address data. According to the address difference between the target address data and the read address data, the pickup is moved to the position of the predetermined address data, so that . reproduction is started from that position.

The nature, principle and utility of the invention will become more apparent from the following detailed description when read in conjunction with the accompanying drawings.

BRIEF DESCRIPTION OF THE INVENTION

DETAILED DESCRIPTION OF THE PREFERRED EMBODIMENT

Figure 1:
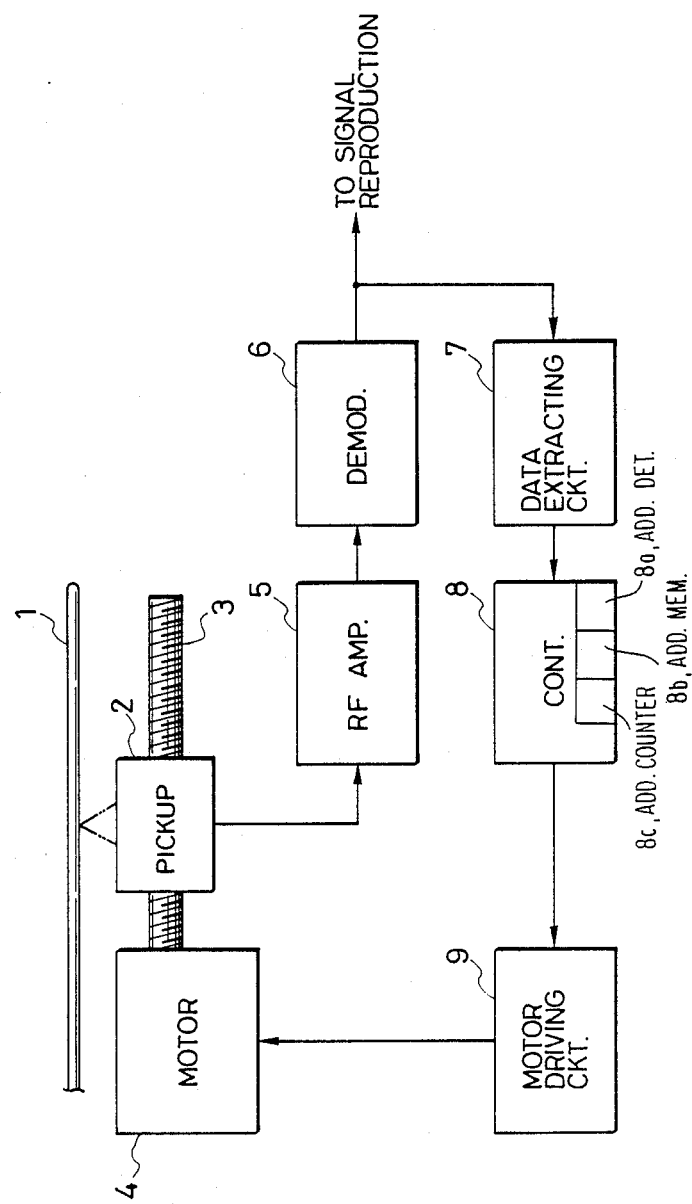
FIG. 1 is an explanatory diagram, partly as a block diagram, showing the arrangement of a disk reproducing device to which a pickup position control method according to the invention is applied.

A disk reproducing device (hereinafter referred to as "a disk player"), to which a pickup position control method according to this invention is applied, is shown in FIG. 1. A pickup 2 for reading data recorded on a disk 1 is threadably engaged with a threaded shaft 3 which extends radially with respect to the disk. As a result, the pickup 2 is moved along the threaded shaft 3 and accordingly moves radially of the disk as the threaded shaft 3 is rotated by an electric motor 4.

The output signal of the pickup 2 is applied, as a read RF (radio frequency) signal, through an RF amplifier 5 to a demodulating circuit 6, where it is demodulated. The output signal of the demodulating circuit is supplied to a signal reproducing system and to a data extracting circuit 7. In the data extracting circuit 7, address data are extracted from the demodulated output of the demodulating circuit 6. The address data are applied to a controller 8 comprising a microcomputer or the like. In the case of a digital audio disk, the address data are stored in a table of contents (TOC) in a disk directory portion of the disk, as referred to in step S10 of FIG. 2 which describes, among other things, a search operation. The address data are stored in the form of a track number (music number), an index umber in a piece of music, and a period of time passed for music performance (minutes and seconds) (hereinafter referred to as "a prior music performance time") in a sub-code Q-channel signal. The controller 8 drives the motor 4 through a motor drive circuit 9 to control the position of the pickup 2 in the radial direction of disk.

The pickup 2 accommodates a focus servo mechanism for maintaining the distance between an objective lens in the pickup 2 and the data recording surface of the disk 1 constant. The pickup also contains a tracking servo mechanism for causing the spot light of the pickup 2 to correctly follow the data-recorded track. Furthermore, the control of the disk player is so designed that, when the power supply is interrupted during reproduction, the pickup 2 is no longer driven and it is mechanically held at the last reading position.

Figure 2:
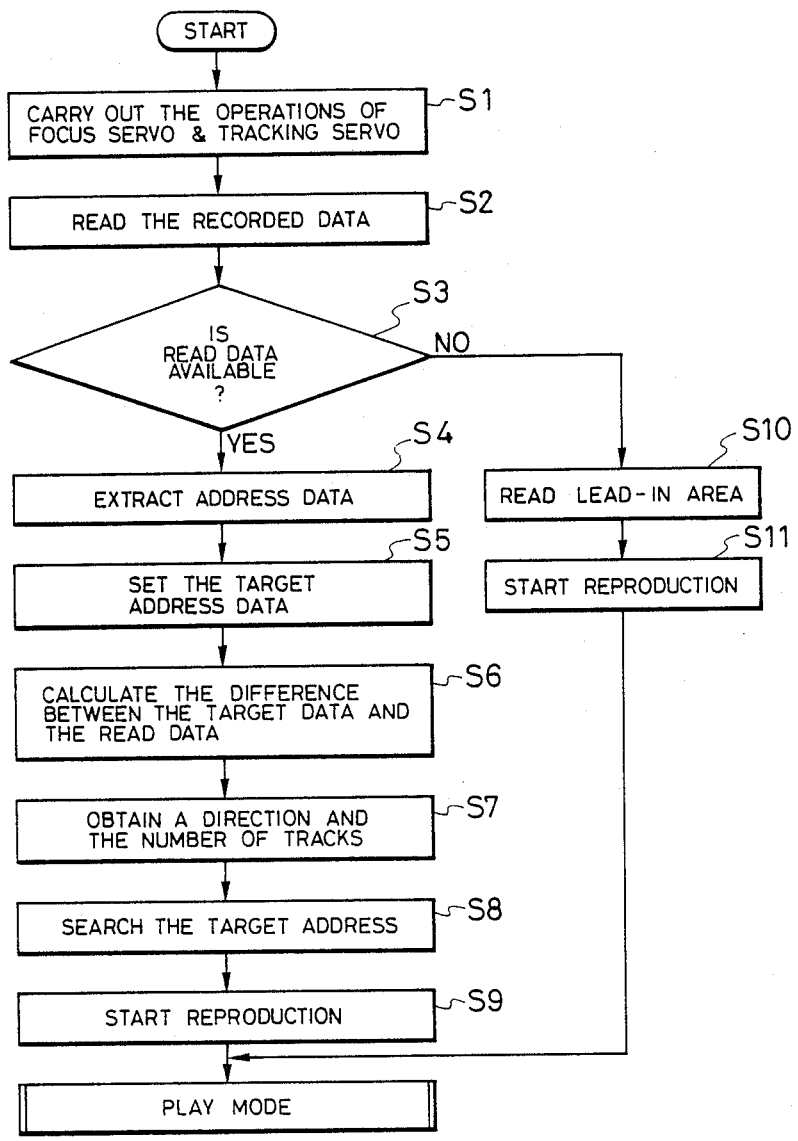
FIG. 2 is a flow chart for a description of the pickup position control method of the invention.

The pickup position control method of the invention which is practiced by the controller 8 will be described with reference to a flow chart in FIG. 2.

When the power supply to the disk player is turned on, whether after an interruption or in normal turning-on, first a focus servo operation and a tracking servo operation are carried out (Step 1), and then the data recorded on the disk 1 are read (Step 2). When the power supply is resupplied to the disk player again after having been interrupted, the pickup 2 is mechanically held at the last reading position to which the pickup was moved just prior to the interruption of the power supply because no move commands have issued to the motor driving circuit 9. Therefore, in the case of a power interruption, the read data can be obtained. On the other hand, when the power supply is supplied to the disk player for the first time after the disk has been set on the disk player, no read data can be obtained, because the pickup 2 is at the home position. As is apparent from the above description, it can be determined from the presence or absence of the read data whether the electric power has been supplied to the disk player after an interruption or for the first time. This determination is carried out in Step 3.

When, in Step 3, it is determined that the read data is available, i.e., the power has been resupplied to the disk player after an interruption, the address data are extracted from the read data (Step 4), so that the track number (music number) and the prior music performance time (XX track YY min. ZZ sec.) at the position where the pickup has been held are obtained, as read address data, from the address data thus extracted. Then, address data for starting reproduction is obtained, for instance as the top address data (XX track, 00 min. 00 sec.) of the track (the group data of a piece of music) to which the read address data belong, and the starting address data is set as the target address data (Step 5). The target address data is the address to be searched for. Therefore, the address difference between the target address data and the read address data is calculated (Step 6), and a direction and the number of tracks for movement of the pickup are obtained from the address difference thus calculated (Step 7). Then, the pickup 2 is moved in the direction while the number of tracks crossed by the pickup are being counted, so that the position of the target address data is searched (Step 8), and the reproduction is started from the position thus searched.

If, in Step 3, it is determined that the read data is not available, i.e., the power supply is supplied to the disk player for the first time after the disk has been set on the disk player, then the pickup 2 is moved to a lead-in area, where the disk directory data is read (Step 10), and then the reproduction is started (Step 11).

In the above-described embodiment, according to the read address data, the address data of the top of the track (the top of the music) to which the read address data belong is employed as the target address data. However, the invention is not limited thereto or thereby. For instance, the address data of a transition position expressed in minutes (XX track, YY min. 00 sec.) or the address data of a transition point between phrases in a piece of music) may be employed as the target address data.

The controller 8 carries out search control, random access control, etc. similarly as in a controller (host microcomputer) in Japanese Patent Application (OPI) NO. 229278/1985 (the term "OPI" as used herein means "an unexamined published application").

As described in that application, information recorded on the disc 1 (FIG. 1) contains program data including address data, and is read by the pickup 2. The information is demodulated by the demodulator 6 as described above, and is supplied to an address detector 8a, which detects address information and the current position of the pickup 2. The latest address data then is loaded into an address memory 8b of the controller/microcomputer 8. The microcomputer 8 also includes an address counter 8c which counts address data at predetermined time intervals during disk playback, and sequentially produces an output signal indicative of the expected address to which the pickup 2 should be moved next.

The address detector 8a compares the information in the address memory 8b and the expected address information in the counter 8c. Depending on the discrepancy (if there is one), the controller 8 may determine that it needs to move farther to get to the target track, or that it has overshot the target track, and so needs to move the pickup 2 back.

In executing search control, there are two situations to consider. First, in a case in which the recorded information on the disk is to be played in sequence, after the table of contents (TOC) section is read, the pickup would be sent to the first location at which there is information which is to be reproduced, and reproduction would be started from there.

If it is desired to start reproduction at another, user-designated point on the disk (as in the case of random access control, for example), the TOC holding the address data in the lead-in area of the disk would be read to determine a target address. The target address then would be searched to find the starting point, at which point reproduction then could be started, in a manner similar to steps S4–S9 in FIG. 2. The position of the pickup 2 during this search is determined by comparing the present address with the target address, and moving the pickup 2 forward (if the target address is greater than the present address) or backward (if the target address is less than the present address). Backward movement may occur more often during random access control, since the playback sequence, instead of being 1-2-3-4 . . . (as would be normal) might be 4-2-3-1 . . . instead.

Depending on the distance the pickup 2 must travel to reach the target address, the pitch of stepwise movement of the pickup 2 may be altered. For a relatively great distance for the pickup 2 to travel, the pitch may be greater than for a relatively small distance to be travelled. This variation of pitch prevents the pickup from being moved in improperly large steps.

As was described above, in the disk player in which, when the power supply is interrupted during reproduction, the pickup is held at the last reading position. According to the pickup position control method of the invention, the reproduction start address data is determined from the read address data obtained from the read data which is obtained at the position where the pickup is located when the power is resupplied to the disk player so that the reproduction is started from the predetermined address data position. Therefore, even if the read data fluctuates greatly, as much as about twenty-seven to seventy-seven seconds, the reproduction is started, irrespective of the fluctuation, from the position which has been finally read. Therefore, the above-described difficulty that, when the power supply is made to the conventional disk player again after having been interrupted, the reproduction of unnaturally sounding music can be eliminated according to the invention.

What is claimed is:

1. A pickup position control method for a disk reproducing device, comprising the steps of when the power supply is interrupted during reproduction:
   holding a pickup for reading data recorded on a disk-shaped recording medium at the last reading position of said recording medium;
   reading by said pickup data recorded on said disk-shaped recording medium on said last reading position when said power supply is resupplied to said disk reproducing device;
   generating target address data according to read address data in said read recorded data, said target address data having a predetermined, non-identical relationship to said read address data;
   moving said pickup according to an address difference between said target address data and said read address data to a position indicated by said target address data; and
   beginning reproduction from said position indicated by said target address data.

2. A method as recited in claim 1, wherein said data recorded on said disk-shaped recording medium is divided into divisions of unequal time duration and said position indicated by said target address data is at a starting position of the division containing the position indicated by said read address data.

3. A method as recited in claim 2, wherein said division are tracks.

4. A pickup position controller, comprising:
   a pickup for detecting signals recorded on a disk-shaped recording medium;
   means for moving said pickup radially of said disk-shaped recording medium;
   means for extracting from said detected signal address data indicating a location of said pickup relative to said recording medium;
   means for controlling said moving means according to said extracted address data, wherein said controlling means causes said moving means to hold stationary said pickup at an interruption position during an interruption of power to said controller;
   wherein said controlling means after a supply of power to said controller following said interruption causes said extracting means to extract first address data indicating said interruption position and further includes means for calculating second address data having a predetermined, non-identical relationship to said first address data and means for causing said moving means to move said pickup to a position indicated by said second address data.

5. A controller as recited in claim 4, wherein said data recorded on said disk-shaped recording medium is divided into divisions of unequal time duration and said position indicated by said second address data is a starting position of the division containing the position indicated by said first address data.

* * * * *